United States Patent [19]

Kawana et al.

[11] Patent Number: 4,780,602
[45] Date of Patent: Oct. 25, 1988

[54] IC CARD

[75] Inventors: Shigeyuki Kawana; Harumi Nakano, both of Tokyo, Japan

[73] Assignee: Casio Computer Co., Ltd., Tokyo, Japan

[21] Appl. No.: 894,641

[22] Filed: Aug. 8, 1986

[30] Foreign Application Priority Data

Aug. 22, 1985 [JP] Japan .................. 60-184434

[51] Int. Cl.$^4$ .............................................. G06K 5/00
[52] U.S. Cl. ..................... 235/380; 235/492; 235/437; 365/200; 371/10
[58] Field of Search ............... 235/379, 380, 492, 437; 365/200; 371/10

[56] References Cited

U.S. PATENT DOCUMENTS

| | | |
|---|---|---|
| 3,971,916 | 7/1976 | Moreno . |
| 4,102,493 | 7/1978 | Moreno . |
| 4,105,156 | 8/1978 | Dethloff . |
| 4,211,919 | 7/1980 | Ugon . |
| 4,382,279 | 5/1983 | Ugon . |
| 4,450,559 | 5/1984 | Bond et al. ............... 371/10 |
| 4,520,453 | 5/1985 | Chow ....................... 365/200 X |
| 4,592,024 | 5/1986 | Sakai et al. .............. 371/10 X |
| 4,650,975 | 3/1987 | Kitchener ................ 235/492 X |
| 4,653,050 | 3/1987 | Vaillancourt ............. 365/200 X |

Primary Examiner—David L. Trafton
Attorney, Agent, or Firm—Frishauf, Holtz, Goodman & Woodward

[57] ABSTRACT

When data is written in a predetermined memory area of a data memory in an IC card, a comparator checks whether the data before writing and data actually written in the data memory coincide. In the event of non-coincidence of the compared data, the data to be written is written in a different memory area of the data memory.

7 Claims, 7 Drawing Sheets

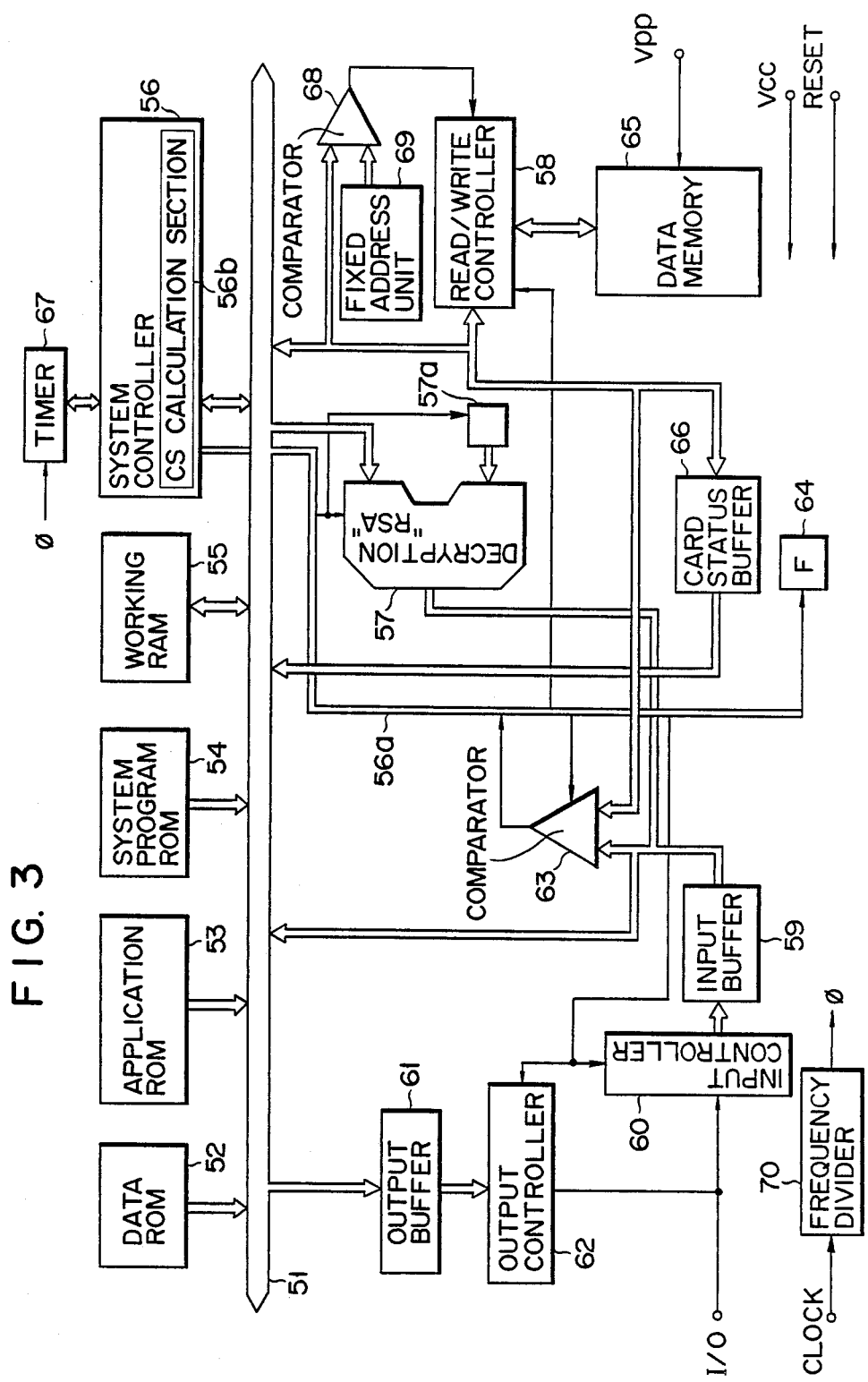
F I G. 3

F I G. 4
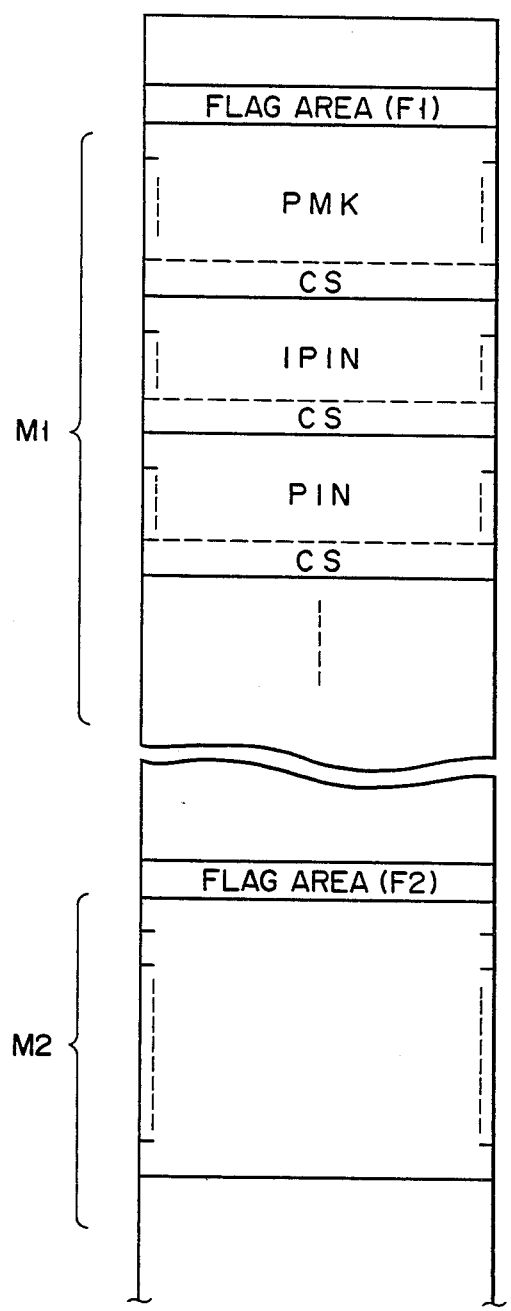

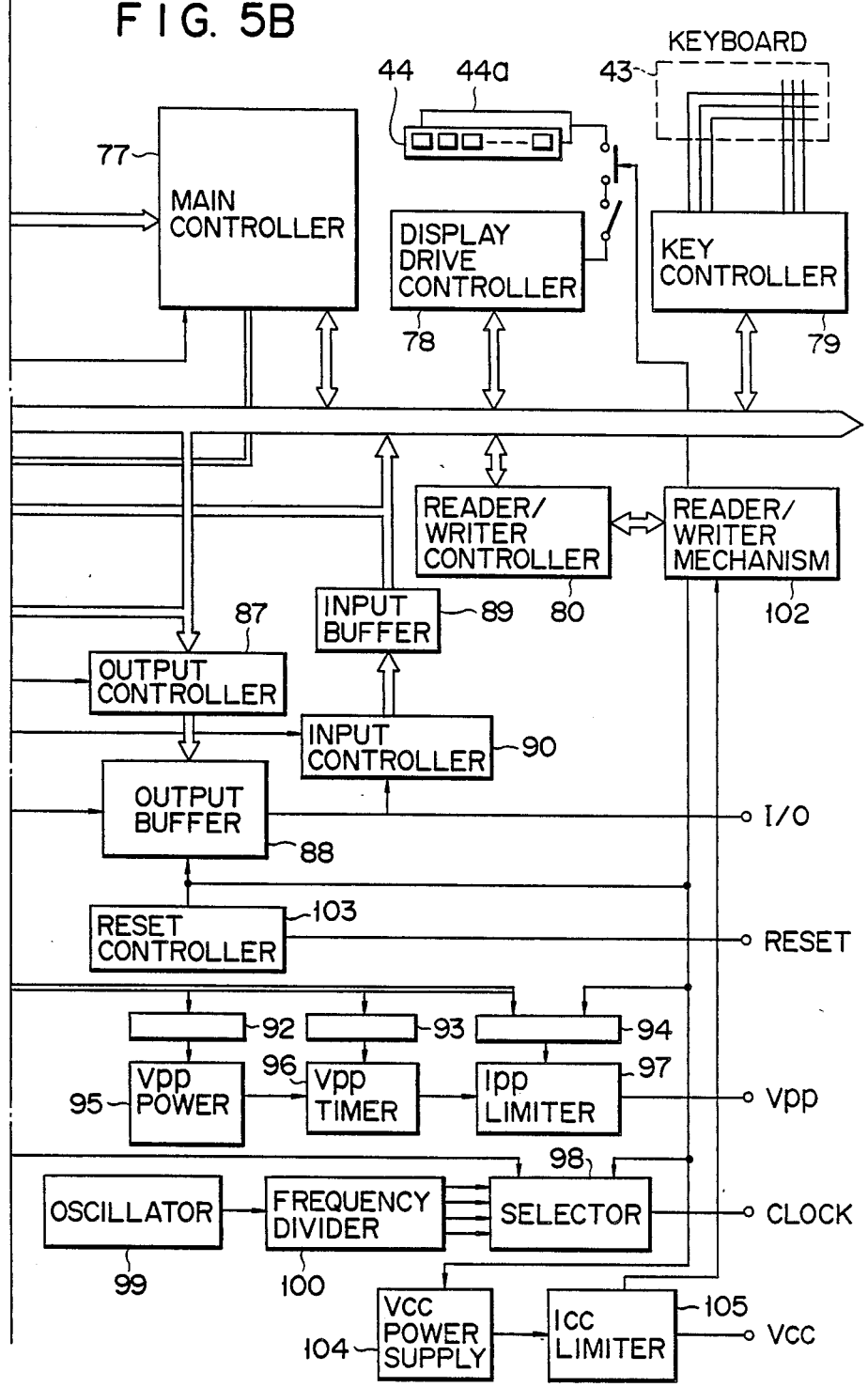

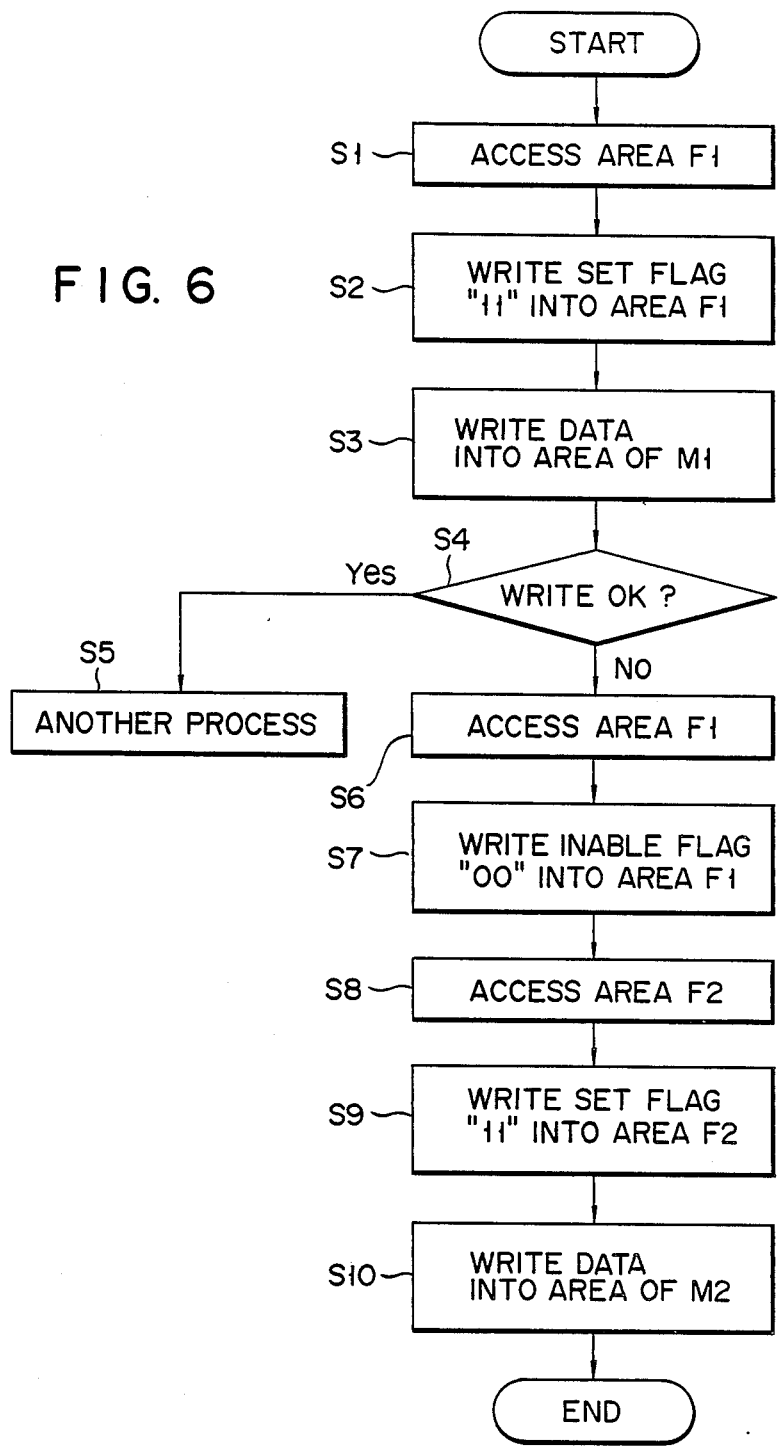

IC CARD

BACKGROUND OF THE INVENTION

This invention relates to an IC card, which is used as a cash card or a credit card issued by a financial institution such as a bank, and also which includes an integrated circuit permitting reliable data writing in it.

The present time has been called a cashless era, and goods can be purchased without using cash simply by utilizing cards issued by credit card companies or the like. Plastic cards, embossed cards, magnetic stripes cards, etc. are usually used as cash or credit cards. These cards, however, have structures which can be easily forged, and their improper use is a significant problem. To solve this problem, an information card has recently been developed which is commonly termed an IC card, in which an IC circuit with a secret key number, etc. stored therein is assembled such that the secret key number can not be readily externally read out. This IC card is difficult to forge and thus has excellent security, and it can also store a large quantity of information.

In the above IC card, usually various data are written with a combination of a CPU (Central Processing Unit) and an EPROM (erasable programmable read-only memory). Data supplied from an external terminal (i.e., a card terminal) is directed through the CPU to a particular address in the EPROM.

However, when there is abnormality in a memory area of the EPROM corresponding to a particular address when writing desired data in the IC card, the writing of data is disabled even though the rest of the EPROM is sound. In this case, the IC card itself is rendered to be invalid.

SUMMARY OF THE INVENTION

An object of the invention is to provide an IC card, which is provided with an integrated circuit to permit reliable data writing without the IC card itself being rendered invalid even when there is abnormality in some memory areas of the IC card data memory.

According to the invention, there is provided an IC card comprising:

data storing means having a plurality of blocks for storing at least secret data in each block;

means for designating the address of a desired memory area of the data storing means to effect writing or reading of data with respect to the designated address memory area;

means for detecting whether data is correctly written in the memory area of the address designated by the address designating means; and control means for functioning at the time of detection by the detecting means of incorrect writing of data in the data storing means to let the address designating means designate a different block and let the data be written again in the other block.

BRIEF DESCRIPTION OF THE DRAWINGS

FIG. 3 is a block diagram showing the circuitry of the IC card shown in FIG. 2;

FIG. 4 is a view showing a memory area configuration of a data memory of the IC card shown in FIG. 2;

FIGS. 5A and 5B form a block diagram showing the circuit construction of a card terminal shown in FIG. 2; and FIG. 6 is a flow chart illustrating an operation of writing data from the card terminal into the IC card data memory.

DETAILED DESCRIPTION OF THE PREFERRED EMBODIMENT

An embodiment of this invention will be described with reference to the accompanying drawings.

[IC Card Manufacturing and Issuing Steps]

Figure 1:
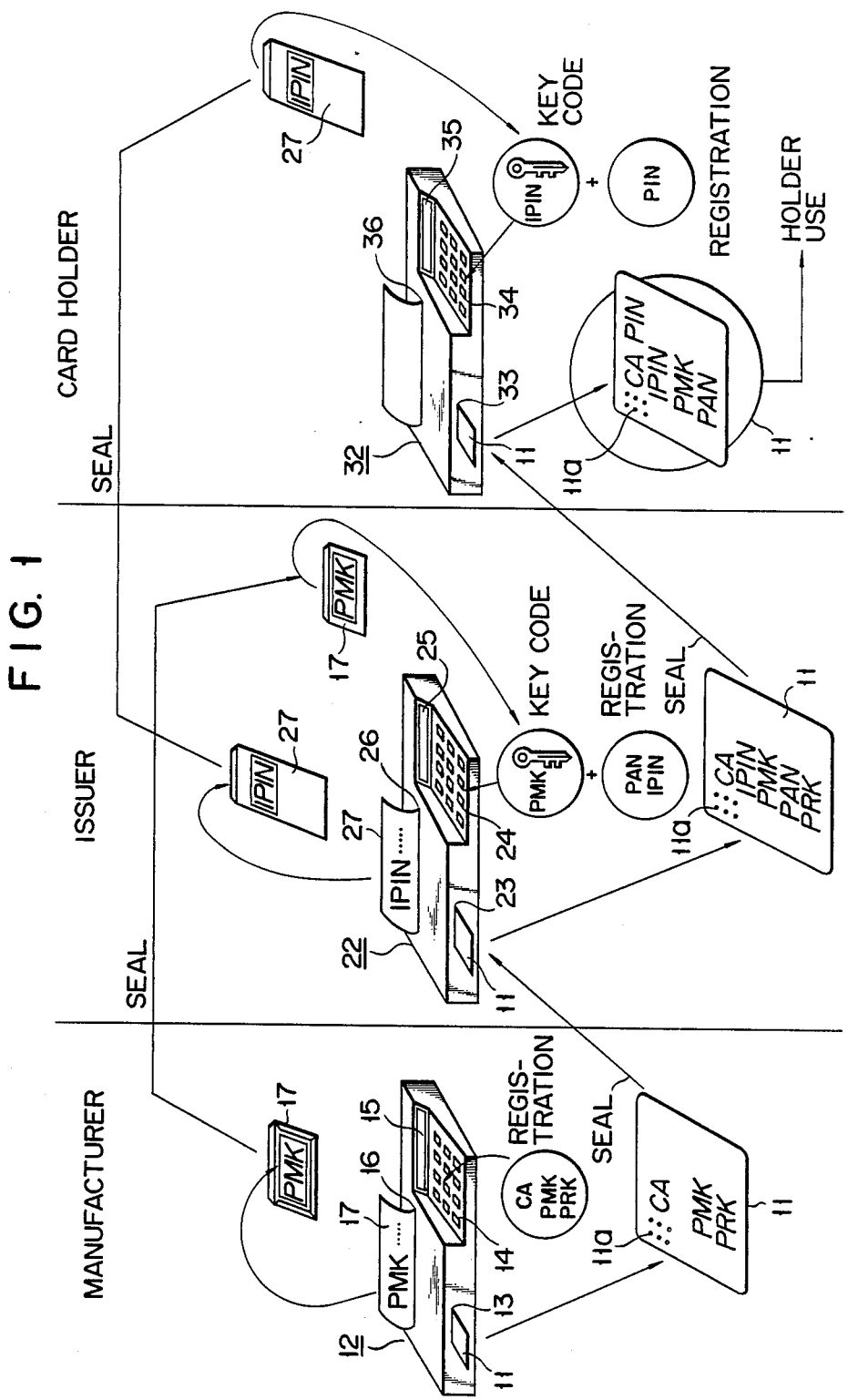
FIG. 1 is a view illustrating an IC card manufacturing step, an IC card issuing step and PIN registration step for an embodiment of the IC card according to the invention.

In FIG. 1, there is shown a flow of the IC card and the card identification data in which the IC card is manufactured and then given to an issuer (for example a bank). The card is then sent to a card owner. The IC card manufacturer produces IC card 11, and card terminals 12, 22, 32, and 41.

The card manufacturer, after producing IC card 11, writes a predetermined code into the card 11 by using IC card manufacturing terminal 12. As will be described in detail later, this IC card 11 contains an internal IC circuit and is provided with a connector or connection terminals 11a on the surface of its case. When the card 11 is inserted in IC card manufacturing terminal 12, these connection terminals 11a make contact with the internal circuits of terminal 12. The card manufacturing terminal 12 contains card insertion slot 13, keyboard 14, display panel 15, and printer section 16. With data input from keyboard 14 by an operator, the different kinds of codes, such as CA, PMK, and PRK, are written into IC card 11. The CA (Card Authenticator) is of a random 64-bit code and is used in the encryption and decryption of messages. PMK (Production Master Key) is a manufacturing number code, and the same PMK is used on all IC cards of one group, such as one lot unit, and is kept secret even in the factory. PRK (Private Key) is a decryption code, which, as will be explained later, corresponds on a one-to-one basis to the Public Key code, or encryption code, which is written into the card terminal. When a given code is written into the IC card by the IC card issuing terminal 12, only the PMK is printed on a security code printing paper 17 by printer section 16. Then, the manufacturer seals the IC card 11 and the security code paper 17 in the same envelope or in different envelopes, and mails them to the issuer. When IC card 11 and paper 17 are sealed in the same envelope, this envelope should be sent via a security mail such as registered mail. The issuer inserts the IC card 11 a he received it from the manufacturer into IC card issuing terminal 22, then reads out the recorded PMK code on the security code paper 17, and inputs the corresponding PMK code into IC card issuing terminal 22. Also, the issuer inputs the primary account number (PAN) and IPIN (Initialization Personal Identification Number) for the IC card 11, into IC card issuing terminal 22. This IPIN is, for example, a 6-bit random code which is used as an identification number until a personal identification number PIN is used. IC card issuing terminal 22, like IC card manufacturing terminal 12, is provided with card insertion slot 23, keyboard 24, display panel 25, and printer section 26. The PMK code which has been written into IC card 11, and the PMK code input from keyboard 24 are compared for coincidence, and only if both codes coincide with each other, the account number PAN is written into IC card 11, and the input IPIN is printed on the security code paper 27. Then, the issuer places the IC card with the PAN as written and the security code paper with the printed IPIN in the same envelope or in separate envelopes, and sends them to the card user. When the card use receives the IC card 11 and the security code paper 27 from the issuer, he or she goes to the card issuing point, inserts his or her card into the IC card user terminal 32, which is installed there, and then reads the recorded contents from the security code paper 27 he or she received from the issuer, and in code, inputs them into IC card user terminal 32. The card receiver also inputs the personal identification number (PIN) of his or her choice into IC card user terminal 32. IC card user terminal 32, like the IC card issuing terminal 22, is equipped with card insertion slot 33, keyboard 34, display panel 35, and printer section 36. The IPIN written in IC card 11 and the IPIN input from keyboard 34 are compared for identicalness, and only if they coincide, the above-mentioned PIN is written into IC card 11. As a result of the above procedure, the issuing of this IC card 11 is complete, and card 11 can now be put to actual use. Beyond this step, further details are referred to in U.S. Ser. No. 645,925 filed Aug. 30th, 1984. No further explanation will be given here.

[External View and Mounting of the Terminal]

Figure 2:
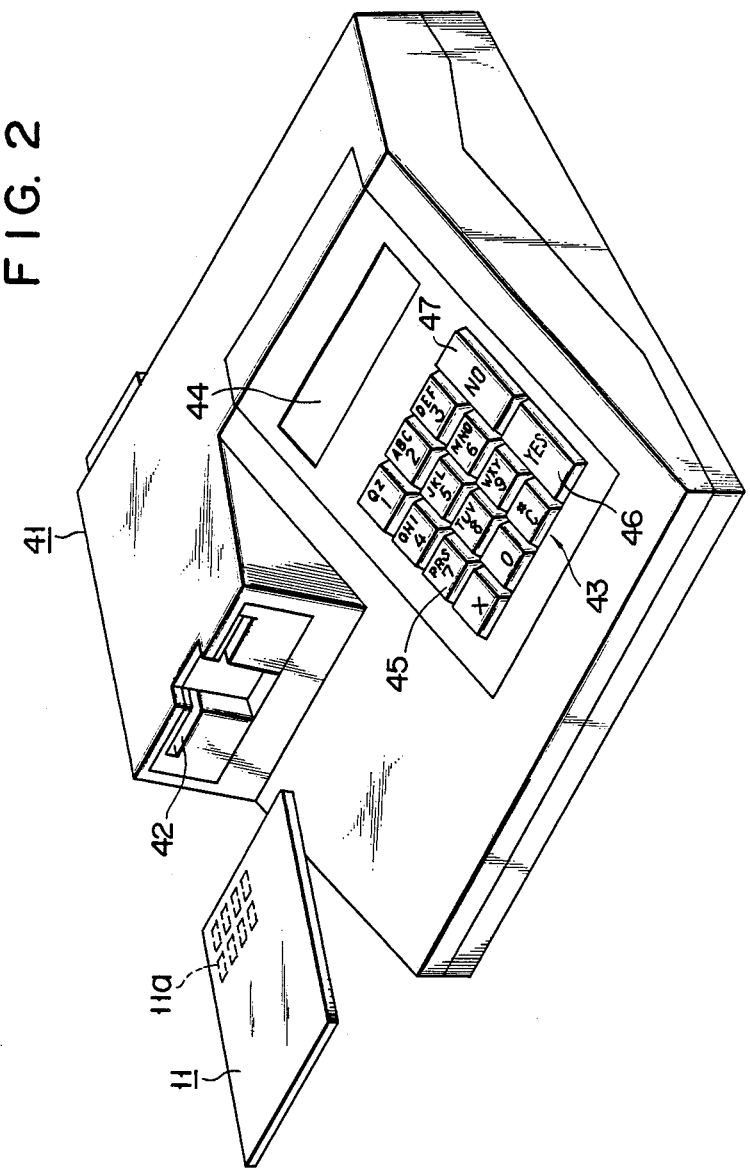
FIG. 2 is a perspective view showing the IC card and card terminals therefor.

FIG. 2 shows the outer appearance of a card terminal device 41 used for IC cards 11, which may be installed in a store, for example, when the terminal device for IC cards is realized according to this invention. This card terminal 41 is composed of card insertion slot 42, keyboard 43, and display section 44. The keyboard 43 uses numerical keys 45, yes key 46, and no key 47. The internal circuits of this card terminal 41 will be explained in detail later.

[IC Card Circuit Configuration]

The configuration of the internal IC circuits of the IC card 11 will be described referring to FIG. 3.

In the figure, system bus 51 is shown. Data ROM 52, application ROM 53, system program ROM 54, working RAM 55, system controller 56, decryption arithmetic unit 57, and read/write controller 58 are all connected to system bus 51. Input controller 60 is connected to this bus via input buffer 59, and output controller 62 is connected to this bus 51 via output buffer 61. Data input/output terminal I/O is connected to input controller 60 and output controller 62.

The above-mentioned ROM 52 stores all the operating conditions pertaining to the card 11 itself, such as data write applied voltage, its current tolerance value and maximum application time, maximum data transmission capacity, and maximum response waiting time. When the initialization of the card itself is finished, this condition data, in conformance with a preset format, is sent to the terminal 41 side as "answer-to-reset" data. The above application ROM 53 stores card classification data APN (application name), which shows the classification of this card 11. The card classification data is put into a specified format and sent out when the attribute exchange occurs with terminal 41, after initial parameters have been set in accordance with the answer-to-reset data. System program ROM 54 contains (besides every kind of system program) ACK and NAC codes, which show if the signal transmitted from terminal 41 is correct or not. System controller 56 has an internal decision area, and outputs operating commands to related circuits in accordance with the data receive signal transmitted via input buffer 59 and operation status. Decryption arithmetic unit 57 performs decryption in accordance with RSA algorithm, and it decrypts input data supplied from the terminal 41 side via input buffer 59, by means of the decryption key code (issuer's private key) stored in key code memory ROM 57a, and outputs it to comparator 63. The comparator output of this secret information comparator 63 is supplied to system control line 56a of system controller 56. This system control line 56a is connected to flag 64, which operates in accordance with the comparison results from the comparator 63. Read/write controller 58 controls the write-in or read-out of data relating to data memory 65 in accordance with the commands from system controller 56. The memory data read out by this read/write controller 58 is output to comparator 63, system bus 51, or card status buffer 66. EPROM (Erasable Programmable Read-Only Memory), for example, is used for this data memory 65. The codes CA, IPIN, PAN, CHN, EPD, PRK, and RTN, and status data ST are written into this memory area.

Comparator 63 compares data $CS_W$ which is obtained in CS calculation section 56b of system controller 56 according to write data temporarily stored in working RAM 55, for instance, by adding data byte by byte, and data $CS_M$ calculated in the same manner according to data written in data memory 65. When non-coincidence of compared data is detected, it is decided that there is abnormality in the data memory 65, and write data stored in working RAM 55 is written in a spare memory area of data memory 65.

The CHN is an abbreviation of "card holder's name". EPD is an abbreviation of "expiration date". RT is the number of times that re-entry has been performed when incorrect data was input. Also, ST shows the current status of card 11. For example, if the manufacturing process of this card has been completed, manufacturing process data is written in, and even if the card has been issued, and the IPIN has not been entered, PIN not entered data is written in. The card status data ST, is arranged in the same format as the card classification data APN as stored in application ROM 53, and sent to the terminal 41 side.

FIG. 4 shows the memory area configuration of data memory 65. The data memory has first memory area M1 which is set to be used that PMK, IPIN, PIN, etc. are written first, and second memory area M2, which is used as a spare memory area when the first memory area M1 is out of use. Memory areas M1 and M2 have flag areas F1 and F2 which can indicate that the corresponding memory area has been used or can not be used. The individual codes or data noted above are progressively written together with the CS data noted above in memory areas.

The above data memory 65 is not limited to use with EPROM, but as an alternative, may also use EEP-ROM (Electrically Erasable Programmable - ROM), for example.

The system controller 56 is connected to timer 67. This timer 67 counts a predetermined time during normal data exchange processing when a start data write voltage supply message is output by card terminal 41. During the count operation of this timer 67, if a positive response signal ACK is not supplied from terminal 41, system controller 56 will stop the data input/output for this card 11. Address comparator 68 is connected to the bus line which connects read/write controller 58 and system bus line 51. This address comparator 68 always compares the unused specific address entered in fixed address unit 69 at the end of the test following completion of manufacture, and the specific address specified via system bus 51. The result of the comparison by comparator 68 is supplied to read/write controller 58. In this way, only when the comparing output is the address coincident signal due to improper use of the terminal, it clears all of the data in data memory 65, thereby preventing secret data from being read out of the card. In a situation where the IC card 11 is coupled with card terminal 41, the terminal supplies a reset signal RESET and a system clock signal clock through a connector (connection terminal) to the IC card. Vcc and Vpp power supplies are also supplied to it. Vcc power source is a system drive power source, and Vpp power supply is used for the data writing to data memory 65. Its power voltage is set up by terminal side on the basis of the answer to reset data as stored in data ROM 52. The system operation signal based on system clock is supplied through frequency divider 70.

[Terminal Circuit Configuration]

Figure 5A:
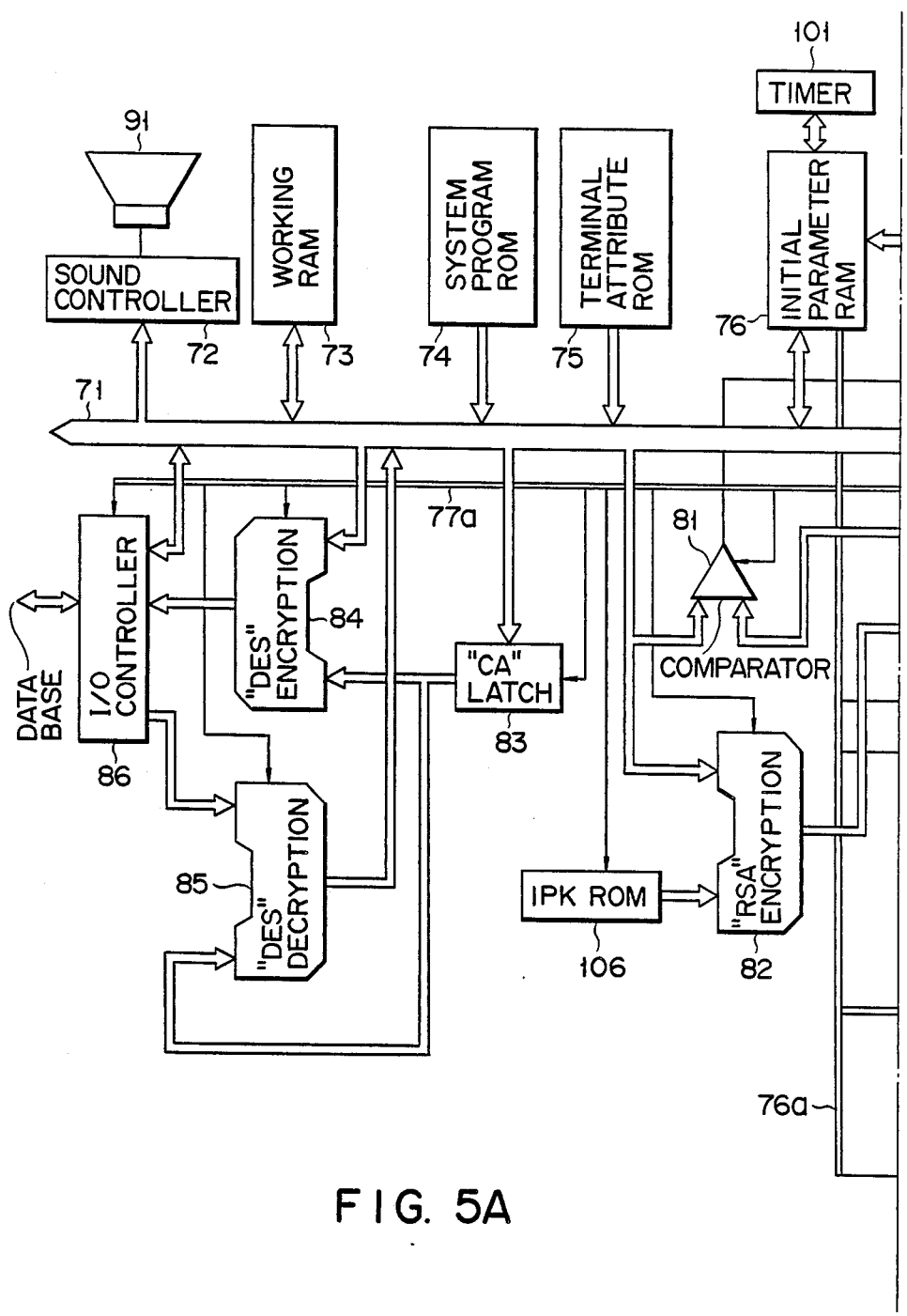

A circuit configuration of card terminal 41 will be given referring to FIGS. 5A, 5B.

In the figure, system bus 71 is coupled with sound controller 72, working RAM 73, system program ROM 74, terminal attribute ROM 75, initial parameter RAM 76, main controller 77, display drive controller 78, key controller 79, reader/writer controller 80, comparator 81, encrypting arithmetic unit 82 based on "RSA" algorithm, latch circuit 83 for latching "CA", encrypting arithmetic unit 84 of the DES system based on data encryption standard, decrypting arithmetic unit 85 of DES system, input/output (I/O) controller 86, and output buffer 88 through output controller 87, and input controller 90 through input buffer 89.

Sound controller 72 is coupled with speaker 91 for sounding an alarm if such a situation occurs. The memory area of working RAM 73 stores "PAN", "CHN" and "EPD" as sent from IC card 11, and other various types of data processed in terminal 41. System program ROM 74 contains various types of system programs, and "ENQ (enquiry)" code for taking matching with IC card 11. Terminal attribute ROM 75 stores terminal code "TC" (manufacturing code, issuing code, shop code, etc.), ( according to the use of the terminal. Terminal code "TC" is transmitted in a predetermined format, after the setting of the initial parameters according to the answer-to-reset data from code 11, and when an attribute exchange with the code 11 side is performed. Then, the answer-to-reset data from the IC card 11 side is stored in its entirety by initial parameter RAM 76. This initial RAM 76 is connected to output controller 87, input controller 90, Vpp level latch unit 92, Vpp timer latch unit 93, and Ipp level latch unit 94 via initial data transmission line 76a. Also, each latch unit is connected to its corresponding Vpp power supply 95, Vpp timer 96, or Ipp limiter 97. The output of the Vpp power supply is connected to the Vpp output terminals by way of Vpp timer 96 and Ipp limiter 97 successively. The maximum data transmission capacity of card 11, which is controlled by main controller 77, the card data maximum write voltage by Vpp power supply 95, the write voltage supply time by Vpp timer 96, and the card data maximum application write current by Ipp limiter 97 are all set by the answer-to-reset data as set in initial parameter RAM 76.

IC card operating frequency selector 98 is connected to the data transmission line 76a. The oscillating signal from oscillator 99 is supplied to this selector 98 via frequency divider 100. The oscillating signal with a predetermined frequency is output from the clock terminals. Also, timer 101 is connected to the above initial parameter RAM 76. This timer 101 counts the maximum response waiting time from an instance that an enquiry signal "ENQ" or other command signals is sent from the terminal 41 side to the card 11 side, according to the answer-to-reset data as sent fom the IC card 11 and stored in initial parameter RAM 76. During this waiting time, if some kind of response signal is not received from the card 11 side, main controller 77 again directs the transmission of the above ENQ or other command signal, or directs via reader/writer controller 80 that reader/writer mechanism unit 102 be disconnected from card 11.

System control line 77a of main controller 77 is connected to comparator unit 81, decryption arithmetic unit 82, latch circuit 83, and input/output controller 86. According to the operation status of the system, control commands are sent to every circuit unit from main controller 77. Display drive controller 78 controls display section 44 and back light 44a constructed with EL elements provided on the rear side of display section 44. This back light 44a lights only when IC card 11 is inserted into the reader/writer mechanism 44. Key controller 79 provides a key sampling signal to keyboard 43, and detects the key input signal. Then, reader/writer controller 80 controls the operation of reader/writer mechanism unit 102. This reader/writer mechanism unit 102 is provided with a card conveying motor, which conveys card 11 from card insertion slot 42 to a specified location, and after completion of the given processing, returns card 11 to card insertion slot 42. This unit 102 is further connected to output buffer 88, reset controller 103, Ipp level latch 94, operation frequency selector 98, and Vpp power supply 104. The terminals corresponding to these units I/O, Reset, Vpp, clock, and Vcc are set at high impedance only when IC card 11 is not inserted.

Output controller 87, which is connected to input terminals I/O via input controller 90 and output buffer 88, controls the transfer of data between card terminal 41 and IC card 11, according to the command received from main controller 77 via initial parameter RAM 76. The input controller 90 outputs the data from IC card 11 via input buffer 89 to memory device units, such as working RAM 73. Output controller 87 sends the data received from the memory device of terminal attribute ROM 75 to the IC card 11 side via output buffer 88. Data input from the IC card 11 via input buffer 89 is sent to comparator 81 via the bus line, and the output of that comparator is supplied to main controller 77. Further, the above output controller 87 sends the decryption data as received from encrypting arithmetic unit 82, to IC card 11 via output buffer 88. Encrypting arithmetic unit 82 encrypts the data (PAN) from working RAM 73 via system bus 71, according to the public key code received from IPK (Issuer's Public Key) ROM 106 as data ROM. The public key code which corresponds to the PRK stored in data memory 65 of IC card 11, is already written into IPK ROM 106. In response to a command from main controller 77, this memory code is output.

"CA" latched in latch circuit 83 is input to encrypting arithmetic unit 84 and decrypting arithmetic unit 85. Given data is input to encrypting arithmetic unit 84 via system bus 71. "PAN" stored in working RAM 73 is encrypted, with the key of "CA", in response to the command from main controller 77, and output to input-/output controller 86. The data base, i.e. the encrypted data, is output to the host computer, when it is connected in an on-line manner. This input/output controller 86 outputs the data base, in other words, data which is encrypted when the host computer is on line, to the host computer. Input/output controller 86 decrypts the crypted data from the host computer according to the CA by decrypting arithmetic unit 85, and outputs it to system bus 71.

OPERATION OF AN EMBODIMENT OF THIS INVENTION

Now, an operation will be described with reference to the flow chart of FIG. 6 in connection with a case when writing in IC card 11 as shown in FIG. 1 code PMK at the time of manufacture, code IPIN at the time of issuance and PIN in the card holder.

To write PMK on IC card 11 at the time of the manufacture thereof, the code PMK is supplied from card terminal 41, and it is transmitted to system program ROM 74 as PMK-write command through output buffer 88 and I/O terminal to IC card 11. In IC card 11, the PMK-write command is supplied through input buffer 59. The data PMK is thus stored in working RAM 55, and it is supplied to address comparator 68. Address comparator 68 compares a write address designated by card terminal 41 and a specific non-used address stored in fixed address unit 69. If the addresses compared in comparator 68 are found to be non-coincident, it is decided that the write command from card terminal 41 is proper, and the code PMK is supplied to read/write controller 58. Then, in step S1 flag area F1 of data memory 65 shown in FIG. 4 is accessed. In step S2 data "11" is stored as flag data representing that the memory area has been used in flag area F1. In subsequent step S3, PMK is stored in memory area M1 corresponding to flag area F1 through read/write controller 58. The data PMK stored in memory area M1 is read out once through read/write controller 58 and its check sum $CS_M$ is calculated in CS calculation section 56b in system controller 56. In step S4, this check sum $CS_M$ is supplied to one input terminal of comparator 63 to be compared to check sum data $CS_W$ based on data PMK stored in working RAM 55. If the check of step S4 yields "Yes", that is, if $CS_W$ based on PMK from card terminal 41 and $CS_M$ based on PMK stored in memory area M1 of data memory 65 are found to be coincident, it is confirmed that the code PMK is correctly written. Then, the routine goes to step S5 of data exchange with respect to card terminal 41.

If the check of step S4 yields "No", that is, if $CS_W$ based on PMK from card terminal 41 and $CS_M$ based on PMK stored in memory area M1 of data memory 65 are found to be non-coincident, it is decided that the code PMK is not correctly written. In this case, a judgement is given that there is some abnormality in memory area M1. The routine then goes to step S6, in which flag area F1 of data memory 65 is accessed. In subsequent step S7, data "00" is stored as flag data representing that the memory area can not be used in flag area F1. In subsequent step S8, spare flag area F2 is accessed. In step S9, data "11" is written as flag data representing that the memory area has been used is stored in flag area F2. In subsequent step S10, data PMK stored in working RAM 55 is stored in memory area M2 corresponding to flag area E2 through read/write controller 58.

It is to be understood that when there is abnormality in memory area M1 of data memory 65, the incapable-of-use flag is set in flag area F1 of memory area M1, the used-area flag is set in flag area F2, and the code PMK is written in corresponding memory area M2 from card terminal 41. Thus, it is possible to write important data reliably even when there is an incapable-of-use area in part of data memory 65 consisting of EEP-ROM or the like.

When writing IPIN and PIN in data memory 65 of IC card 11 in the IC card issuing step and PIN registration step after completion of writing of PMK in the IC card manufacturing step, the operation proceeds after the flow chart of FIG. 6. That is, if the memory area where PMK has been written is memory area M1, it is confirmed that the flag of flag area is "11", and data IPIN and then data PIN may be written in memory area M1 subsequent to the address where the data PMK has been written. However, if data $CS_W$ and $CS_M$ compared in comparator 63 at the time of writing of IPIN or PIN are found to be non-coincident, like the case of alteration of memory area in steps S6 through S10 in FIG. 6, an incapable-of-use flag is set in memory area M1, and the data noted above is written in memory area M2. In this case, the data PMK that has already been written in memory area M1 may be stored in working RAM 55 through read/write controller 58 and then transferred to memory area M2. By so doing, the write data from card terminal 41 may be reliably stored in memory area M2 corresponding to flag area F2 where the used area flag has been set.

In the above embodiment, the memory area for writing data supplied form card terminal 41 has been explained as two blocks M1 and M2 as shown in FIG. 4. However, preferably as many memory areas M may be provided in data memory 65. In this case, it is possible to secure the data write area reliably, for instance, secure memory area M2 in case if memory area M1 is incapable of use, secure area M3 if area M2 is also incapable of use, secure area M4 if area M3 is again incapable of use. Further, in the above embodiment the data PMK stored in memory area M1 is transferred to memory area M2 when it is found that $CS_W$ and $CS_M$ are non-coincident when writing IPIN or PIN. However, it is possible to let the data remain in memory area M1 without being transferred so that only its read-out is possible.

Further, the data written in memory areas M1, M2, . . . are not limited PMK, IPIN and PIN, but it is also possible to write transaction data of transactions with the IC card and further various other data in the memory areas.

Effectiveness of the Invention

As has been described in the foregoing, according to the invention, in the event of occurrence of abnormality of some memory areas of the IC card data memory, the write data is written in other memory areas. Thus, it is possible to write data reliably without need of rendering the IC card itself invalid, thus permitting more effective utility of the IC card.

What is claimed is:

1. An IC card comprising:

data storing means having a plurality of memory blocks for storing at least secret data in each said block;

means for designating the address of a desired memory area of said data storing means to effect writing or reading of data with respect to said designated address memory area;

means for detecting whether data is correctly written in the memory area of the address designated by said address designating means; and control means for functioning at the time of detection by said detecting means of incorrect writing of data in said data storing means to cause said address designating means designate a different block and cause said data be written again in said other block.

2. An IC card according to claim 1, wherein each block of said data storing means comprises a memory area for storing flag data, and said IC card further comprises means for writing flag data which disables use of a corresponding memory block, in response to the detection by said detecting means of the failure of correct writing of data.

3. An IC card according to claim 1, wherein said detecting means includes means for checking whether data to be written in said data storing means coincides with data written in a memory area designated by said address designating means.

4. An IC card according to claim 3, wherein said detecting means further includes means for calculating a check sum of the data to be written in said storing means, said check sum being written together with data in said storing means, and said checking means includes means for comparing check sum data of the data before being written in said storing means and the already written check sum data.

5. An IC card according to claim 1, wherein secret data stored in said data storing means comprises identification data for checking the validity of the IC card holder.

6. An IC card according to claim 5, wherein said identification data is supplied from a card terminal to which said IC card is attached.

7. An IC card according to claim 2, wherein said data storing means comprises an EPROM.

* * * * *